US008514440B2

(12) United States Patent
Kuramochi

(10) Patent No.: US 8,514,440 B2
(45) Date of Patent: Aug. 20, 2013

(54) IMAGE FORMING SYSTEM

(75) Inventor: Mitsuru Kuramochi, Ibaraki-ken (JP)

(73) Assignee: Riso Kagaku Corporation (JP)

( * ) Notice: Subject to any disclaimer, the term of this patent is extended or adjusted under 35 U.S.C. 154(b) by 1053 days.

(21) Appl. No.: 12/208,838

(22) Filed: Sep. 11, 2008

(65) Prior Publication Data
US 2009/0073493 A1 Mar. 19, 2009

(30) Foreign Application Priority Data

Sep. 13, 2007 (JP) ................................ 2007-237571

(51) Int. Cl.
*G06K 3/12* (2006.01)
*G06K 15/00* (2006.01)
*G06F 15/00* (2006.01)
*G06F 7/04* (2006.01)
*H04N 1/32* (2006.01)

(52) U.S. Cl.
USPC ........... 358/1.16; 358/1.9; 358/1.1; 358/1.15; 358/1.14; 358/468; 726/27

(58) Field of Classification Search
USPC ......... 358/498, 1.14, 1.15; 271/290; 705/51, 705/230; 713/193; 726/2
See application file for complete search history.

(56) References Cited

U.S. PATENT DOCUMENTS

| | | | | |
|---|---|---|---|---|
| 5,328,169 A | * | 7/1994 | Mandel | 271/290 |
| 6,515,765 B1 | * | 2/2003 | Umebayashi | 358/1.9 |
| 6,714,326 B1 | * | 3/2004 | Yamada | 358/498 |
| 7,352,867 B2 | * | 4/2008 | Medvinsky | 380/278 |
| 7,536,562 B2 | * | 5/2009 | Little et al. | 713/193 |
| 7,719,708 B2 | * | 5/2010 | Ferlitsch et al. | 358/1.15 |
| 7,757,162 B2 | * | 7/2010 | Barrus et al. | 715/230 |
| 7,797,731 B2 | * | 9/2010 | Bhagavatula et al. | 726/2 |
| 7,814,553 B2 | * | 10/2010 | Kawabata et al. | 726/27 |
| 2004/0125402 A1 | * | 7/2004 | Kanai et al. | 358/1.15 |
| 2005/0134896 A1 | * | 6/2005 | Koga | 358/1.14 |
| 2005/0171914 A1 | * | 8/2005 | Saitoh | 705/51 |
| 2007/0002391 A1 | * | 1/2007 | Nagarajan et al. | 358/426.07 |
| 2007/0143861 A1 | * | 6/2007 | Ohishi | 726/28 |

FOREIGN PATENT DOCUMENTS

| | | | |
|---|---|---|---|
| JP | 2001282477 | | 10/2001 |
| JP | 2006-215686 | * | 8/2006 |

* cited by examiner

*Primary Examiner* — Akwasi M Sarpong
(74) *Attorney, Agent, or Firm* — Studebaker & Brackett PC

(57) ABSTRACT

In an image forming system for an image forming apparatus for forming an image according to the image forming system under an instruction of a terminal unit connected thereto by way of a network to instruct a formation of an image according to output data, the terminal unit sets an access information such as permitting a particular person to access the output data. The image forming apparatus compares the user information with the access information and outputs an image only when the output user conforms to the particular person. The terminal unit further changes the access information so that a second particular user other than the particular user can temporarily access to the output data and the image forming apparatus can output an image by the use of the output data also when the access information conforms to the second particular user.

9 Claims, 7 Drawing Sheets

| PRINTER SELECTION | | COPY NO. |
|---|---|---|
| Printer-KM100 | | 1 |

CHANGE ALLOWANCE

LEVEL: LEVEL 3
SECTION CODE: B-1

OK  CANCEL

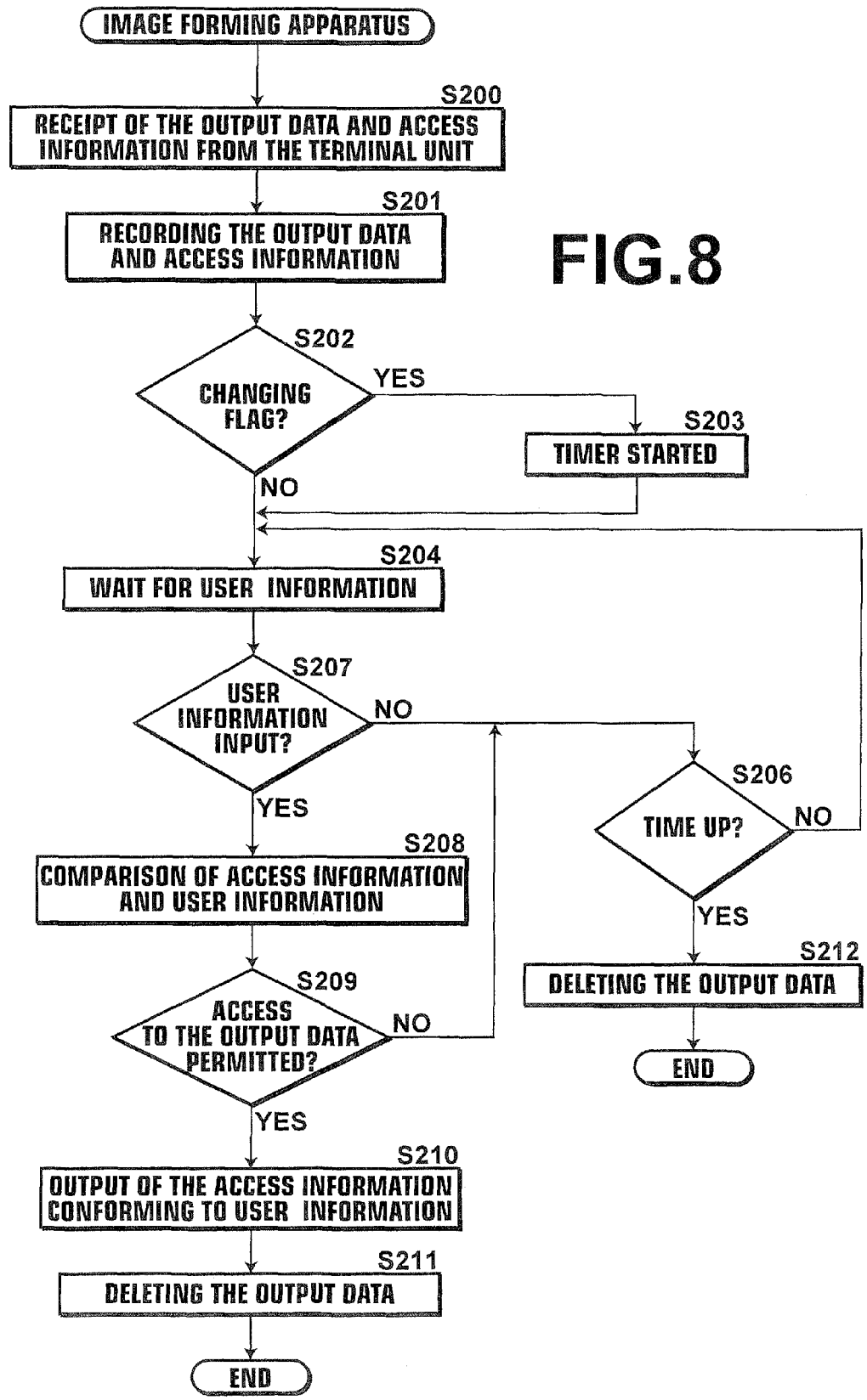

IMAGE FORMING SYSTEM

BACKGROUND OF THE INVENTION

1. Field of the Invention

This invention relates to an image forming system for printing data transferred to a printer from a computer, and more particularly to a high security image forming system for printing high secret data transferred to a printer from a computer remote therefrom by way of a network.

2. Description of the Related Art

There has been put into practice an image forming system where data is transferred from a computer by the use of a network to an image forming apparatus or a printer server remote from the computer to print according to the data. In such a system, since the data transferred to the image forming system is once stored and then printed in the order of transfer, the man (or woman) who has instructed the printing from the computer seldom meets the data printed out. Accordingly, there arises a problem that the printed paper is left in the image forming system, which opens secret of the data.

In order to provide such a problem, there are proposed various methods of keeping the secret where print of data is inhibited if the IC card, password or the like is not input by providing the image forming system with an input means through which a hard key such as an IC card is input, or a keyboard through which a password is input. (See, for instance, Japanese Unexamined Patent Publication No. 2001-282477.) In such a system where print of data is allowed if the IC card, password or the like is input, the security is ensured on the assumption that the IC card is prepared by a man (or woman) who has instructed printing himself (or herself) or a man (or woman) who belongs to the same section as his (or hers) and the man (or woman) who has instructed printing himself or a man (or woman) who belongs to the same section as his (or hers) takes out the printed paper.

SUMMARY OF THE INVENTION

However, it sometimes becomes necessary to have some person who is not the person who has instructed printing get the printed paper since a plurality of the image forming systems are connected to the network and the computer through which he or she has instructed the printing is sometimes far from the image forming system. Accordingly, it becomes necessary to deliver the IC card or to disclose the password to the other person so that the person can receive the printing matter instead of him or her. In such a case, though he or she wants the other person to receive only a particular printing matter, the image forming system can print data other than the data he or she wants the other person to receive since data corresponding to the IC card or the password are all printed in the order of transfer.

Further, though it is not preferred to deliver the IC card or to disclose the password to other persons in keeping the secret, too strict management deteriorates the convenience of practical appliance thereof and the function of ensuring the secret itself is not useful.

The object of the present invention is to provide an image forming system which can keep a secret of output data while improving the convenience of the user.

In accordance with the present invention, there is provided an image forming system for an image forming apparatus which is for forming an image according to output data of the image forming system under an instruction of a terminal unit connected thereto by way of a network to instruct a formation of an image according to output data, the terminal unit comprising an access information setting means which sets an access information representing that only a particular user can access to the output data and the transmitting means which transmits the access information together with the output data to the image forming apparatus and the image forming apparatus comprising a receiving means which receives the access information together with the output data, an output data storage means which stores the output data received by the receiving means, an input means through which user information on a user for whom the data is to be output, and an output means which compares the user information and the access information, and outputs an image by the use of the output data stored in the output data storage means only when the user for whom the data is to be output conforms to the particular user, wherein the terminal unit further comprises an access information changing means which temporarily changes the access information so that a second particular user other than the particular user can access to the output data and the output means can output an image by the use of the output data stored in the output data storage means when the user for whom the data is to be output conforms to the second particular user so long as the access information has been temporarily changed by the access information changing means so that a second particular user other than the particular user can access to the output data.

The "image forming apparatus" may be any such as the ink jet printer, the laser printer, the stencil printer, or the like so long as it can form an image by the use of data.

The "terminal unit" means an instrument or a computer provided with a user interface which asks another computer or another instrument to do a service or processing by transferring the input from the user to the "another computer or another instrument" by way of the network.

The "particular user" need not be limited to one user but may be a plurality of users. For example, the particular users may be a plurality of persons who belong to the same section.

The output means which outputs an image by the use of the output data may be any so long as it makes the image output from the output data be in a visually recognizable state. For example, it may print on the recording medium such as a paper or display on a display.

The "image forming apparatus" is preferred to have a deleting means (first deleting means) which deletes the output data stored in the output data storage means after the output means outputs an image by the use of the output data when it receives the access information together with the output data.

Further, the "image forming apparatus" is preferred to further have a deleting means (second deleting means) which deletes the output data stored in the output data storage means if an image is not output from the output means by the use of the output data a predetermined time after the output data is stored in the output data storage means when it receives the temporarily changed access information together with the output data.

In the first deleting means, "when it receives the access information together with the output data" includes both the cases where it receives the temporarily changed access information together with the output data and where it receives the unchanged access information together with the output data.

Further, the "terminal unit" is preferred to further have a change allowing means for inputting an allowance of a change of the access information and the access information changing means is permitted to change the access information only when the change allowing means inputs an allowance of a change of the access information.

In accordance with the present invention, when an image forming apparatus outputs a printed matter and the like, the image forming apparatus does not output an image on the basis of the output data transferred from the terminal unit as soon as it is transferred, but once stores it in the output data storage means and only when that the user for which the image forming apparatus is to output is the particular user is confirmed by the use of IC card or the like, the image forming apparatus is permitted to output, and when the access information is changed so that another particular user can temporarily access to the output data by the terminal unit, only the printed matter on the basis of the output data with the changed access information can be taken out from the image forming apparatus. Accordingly, a secret printed matter can be delivered to the limited person other than the original user without exposing it to eyes of many people.

When the output data once stored in the image forming apparatus is deleted after output of the output data, the secret data is not stored long in the image forming apparatus and will be safe.

When the output data is automatically deleted after output of the output data, the secret data is not stored long in the image forming apparatus and will be safe if the output data is not output even if a predetermined time lapses after the access information once stored in the image forming apparatus is changed.

BRIEF DESCRIPTION OF THE DRAWINGS

FIG. 8 is a flow chart showing processing of the image forming apparatus.

DESCRIPTION OF THE PREFERRED EMBODIMENT

Figure 1:
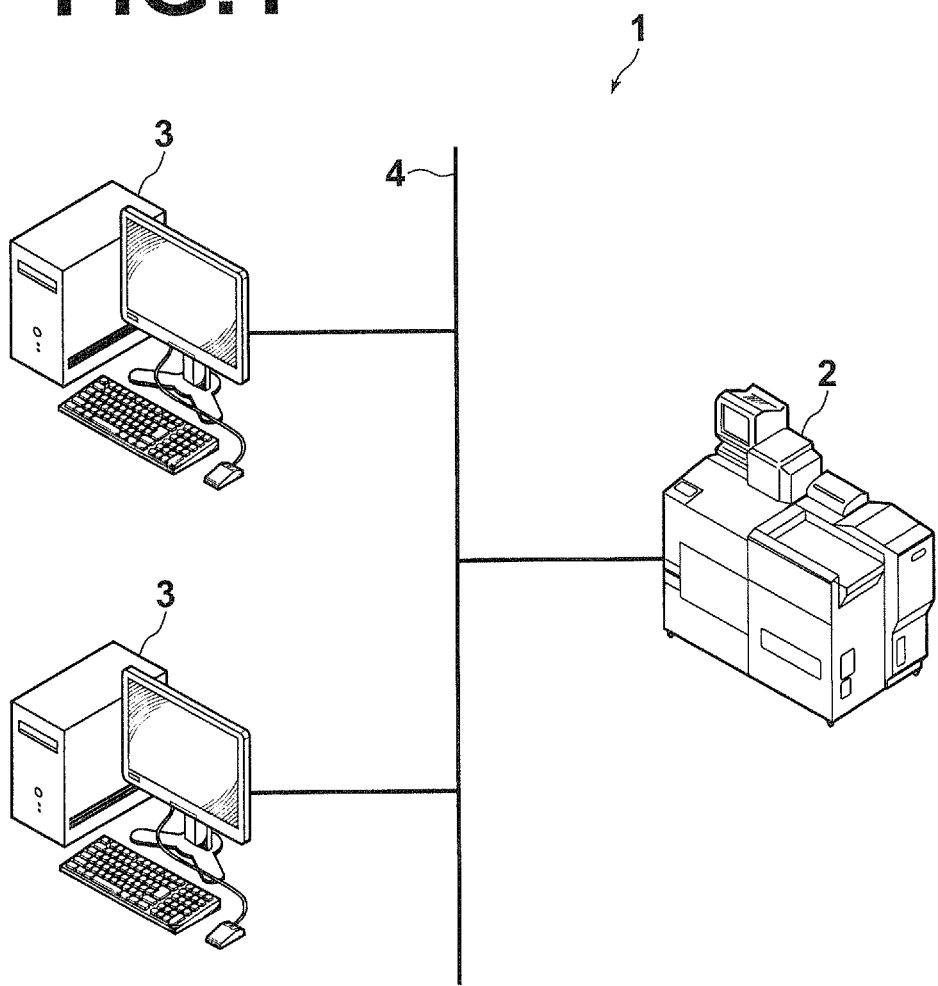
FIG. 1 is a view showing the image forming system.

An image forming system in accordance with an embodiment of the present invention will be described with reference to the drawings, hereinbelow. FIG. 1 is a view showing the image forming system in accordance with this embodiment.

The image forming system 1 comprises an image forming apparatus 2 which forms an image by the use of output data, a terminal unit 3 which instructs the image forming system 1 to form an image by the use of output data, and a network 4 connecting an image forming apparatus 2 to the terminal unit 3.

The network 4 is a local area network which connects the image forming apparatus 2 to a plurality of terminal units 3.

The image forming apparatus 2 may be the ink jet printer, the laser printer, the stencil printer, or the like, and is connected to the terminal units 3 by way of the network 4. In this embodiment, the description will be made on the case where the image forming apparatus 2 prints on a printing paper according to the output data which the user has instructed through each of the terminal units 3 remote from the image forming apparatus 2.

The terminal unit 3 is realized by executing on a computer the software which provides a user interface and/or a device driver which transmits data to and from the image forming apparatus 2. The software is installed in the computer from a recording medium such as CD-ROM or by distributing a program by way of a network such as the Internet.

Figure 2:
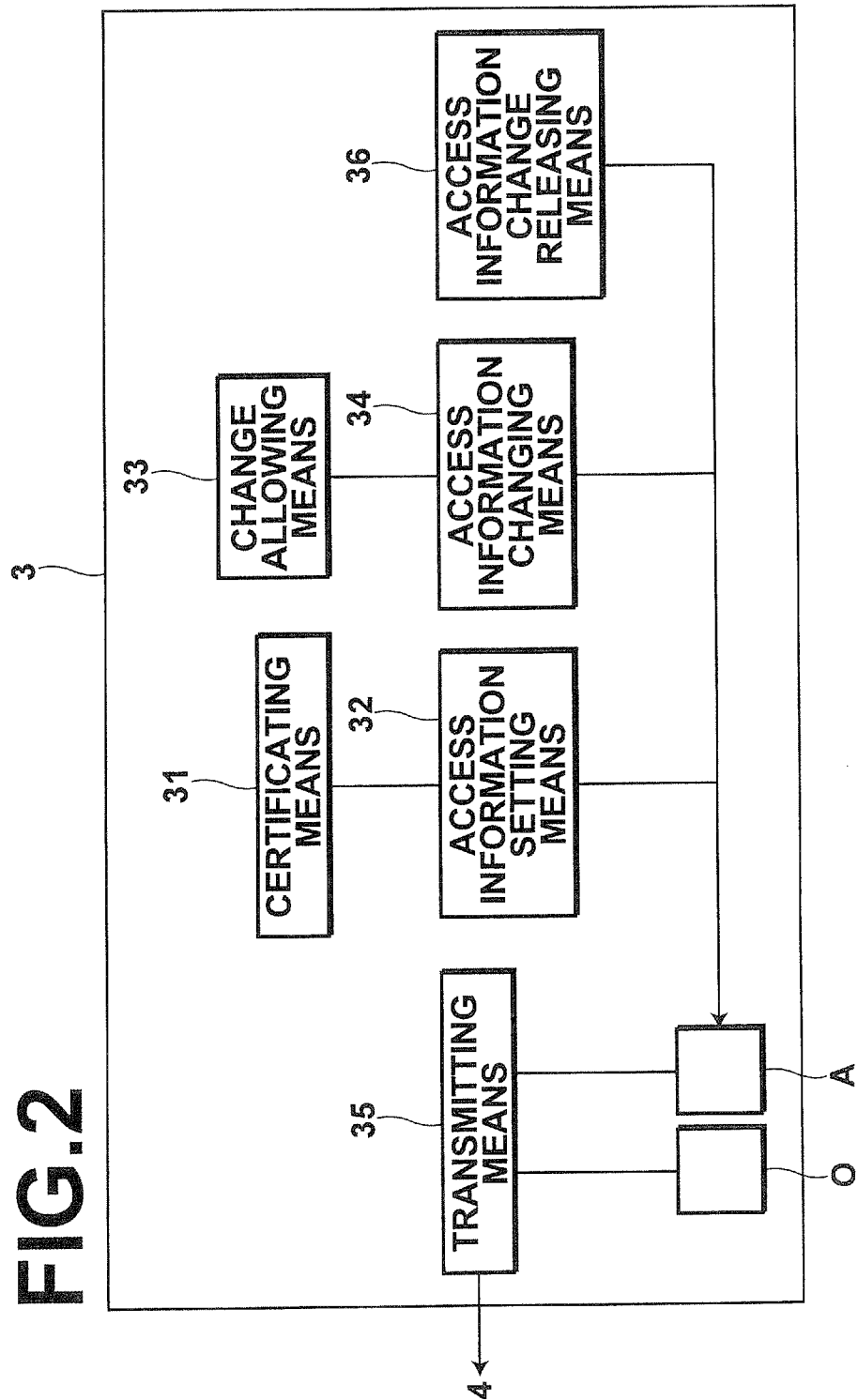
FIG. 2 is a view showing the terminal unit.

The terminal unit 3 comprises, as shown in FIG. 2, a certificating means 31 which certificates the user, an access information setting means 32 which sets an access information A representing that only a particular user can access to the output data O, an access information change allowing means 33 through which permission of change of the access information A is input, an access information changing means 34 which changes the access information A, a transmitting means 35 which transmits the access information A together with the output data O to the image forming apparatus 2, and an access information change releasing means 36 which releases change of the access information A.

The certificating means 31 has a log-in screen on the displaying screen for inputting the user name and the password to promote the operator to input the user name and the password and certificates the user by comparing input user name and password with a certification information which has been set in advance.

The access information setting means 32 sets to the output data O an access information A according to the certificated user. The access information A represents the users who have the right of access to each output data O.

Figures 4, 5:
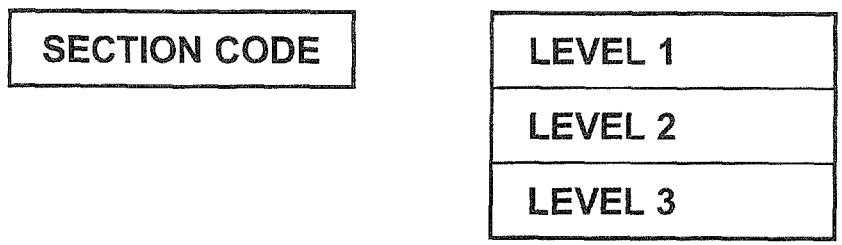
FIG. 4 is a view for describing the security level.
FIG. 5 is a view showing an example of the screen for confirming and changing the secret level.

The right of access is managed so that only particular persons can access the output data O, for instance, the persons in the same section can access the output data O while the persons in different sections cannot access the output data O. Further, the right of access is managed dividing the security level into a plurality of security levels. As shown in FIG. 4, the security level is divided, for instance, into three security levels. The persons in the same section can access the output data O in the level 1, while only the persons not lower than the administrative in the section can access the output data O in the level 2, and only the top of the section can access the output data O in the level 3. The right of access is not independent from each other, but the user having a higher level right of access can access the output data O attached with a lower level right of access. For example, the user having a right of access in the level 3 can access the output data O attached with an access information A representing levels 1 and 2.

Further, what level of right of access each user has may be, for instance, registered in advance in correspondence with the user name upon log-in so that the access information A is set according to the contents of this registration. When the user name certificated upon log-in has been registered as a user in the level 3, the section code to which the user belongs and the level 3 are set in the access information A.

The access information change allowing means 33 provides a user interface which permits change of the access information A only when there is a particular input. From the viewpoint of security, it is not preferred that the access information A can be easily changed, and when the interface is such that the access information A can be easily changed, the access information A can be changed to a wrong information by mistake. Accordingly, the access information A cannot be changed unless a special manipulation so that the access information A cannot be changed to a wrong information by mistake. For example, there is displayed a screen such as shown in FIG. 5, and when a "change permission" button is selected, an input portion of the secret level and the section code (the part in FIG. 5 surrounded by the dotted line) is made active and the access information A can be changed. In the state where the change permission button is not pushed, an input portion of the secret level and the section code is made inactive and/or the access information A cannot be changed unless a special key is input through the key board or the screen is changed to a predetermined screen.

The access information changing means 34 changes the access information A so that another user other than the user who has been set by the access information setting means 32 can temporarily access the output data O. For example, when the right of access is changed according to the manipulation of the operator through an input screen for inputting the secret level and the section code such as shown in FIG. 5, a changing flag representing that the user who can access the access information A is changed and the changed secret level and section code are set to the access information A as changed information.

The transmitting means 35 transmits the access information A together with the output data O to the image forming apparatus 2. Concretely, for instance, the access information A is transmitted to the image forming apparatus together with the output data O attached to the output data C as information on the attribute of the output data O. Since may only have to be linked with the output data O, the access information A may be transmitted separately from the output data O.

The access information change releasing means 36 releases the change of right of access and returns the access information A to the state before the change when transfer of the output data O instructed to print byway of the transmitting means 35 of the terminal unit is ended so that the change of right of access is effected only for one event.

Figure 3:
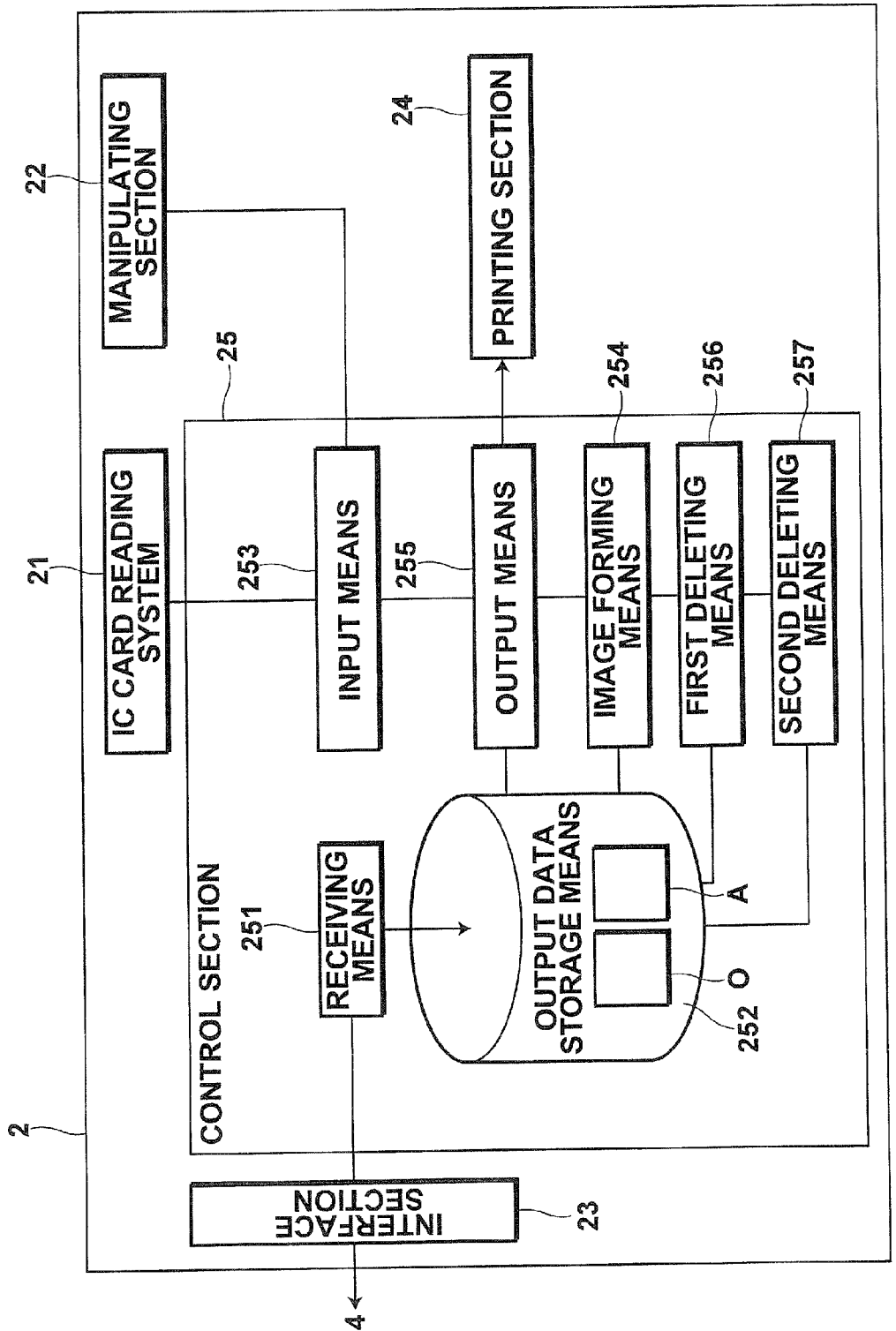
FIG. 3 is a view showing the image forming apparatus.

The image forming apparatus 2 comprises, as shown in FIG. 3, an IC card reading system 21, a manipulating section 22 with a display section for doing a control such as instruction of printing including the printing number and an input of the password, an interface section 23 to be connected to the network 4, a printing section 24 for printing an image on a printing paper and a control section 25 for controlling each of the components.

The control section 25 comprises a receiving means 251 which receives data transferred from the terminal unit 3, an output data storage means 252 for storing the output data O, an input means 253 which receives the user information input from the IC card reading system 21, the manipulating section 22 or the like, an image forming section 254 which forms an image suitable for printing from the output data O, an output means 255 which outputs an image according to the output data O to the printing section 24, a first deleting means 256 which deletes the output data O attached with an access information A representing that the printing in the printing section 24 according to the output data O is ended from the output data storage means 252, and a second deleting means 257 which deletes the output data O from the output data storage means 252 in the case the output data O is not output from the output means 255 a predetermined time after the output data O attached with an access information A in which the changing flag is set is stored in the output data storage means 252.

The receiving means 251 receives the output data O transferred from the terminal unit 3 by way of the interface section 23 together with the access information A.

The output data storage means 252 comprises a large capacity storage means such as a hard disk and in the output data storage means 252, the output data O and the access information A are spooled received from the terminal unit 3 in the order of receipt.

The input means 253 inputs a user information read out from the IC card by the IC card reading system 21. Otherwise, the input means 253 may input as a user information a password which has been input into the manipulating section 22 provided in the image forming apparatus 2.

The image forming section 254 forms an image which can be printed or displayed by spreading the output data O to bit map data by the use of, for instance, the RIP processing. If necessary, a γ adjustment (contrast/brightness/chroma), letter smoothening processing, screening processing (error diffusion/dots 70/dots 100) and the like may be applied to the image.

The output means 255 compares the user information input from the input means 253 with the access information A before outputting the output data O to determine whether the output data O conforms to the user who can access the output data O and only when the output data O conforms to the user who can access the output data O, the output means 255 forms an image suitable for printing such as bit map data from the output data O by the use of the image forming means 254 and outputs the image to the printing section 24. When the access information A of the output data O is not provided with the changing flag, the output means 255 does not print, unless the output user conforms to the original user in the section and the level. When the access information A of the output data O is provided with the changing flag, the output means 255 prints even for the user who conforms to the user who has been recorded in the changed information in the section and the level. At this time, the output means 255, of course, prints if the output user conforms to the original user in the section and the level.

The first deleting means 256 deletes the output data O from the output data storage means 252 immediately after the printing when the access information A is attached to the output data O printed by the output means 255.

On the other hand, the second deleting means 257 deletes the output data O from the output data storage means 252 a predetermined time after the output data O is stored in the output data storage means 252 when the changing flag is set in the access information A to temporarily change the user who can output the output data O. With this arrangement, the second deleting means 257 automatically deletes the output data O from the output data storage means 252 in the case the output data O is not output from the output means 255 a predetermined time after the output data O is stored in the output data storage means 252, whereby the secret data can be prevented from being left in the printer by accident.

Figure 7:
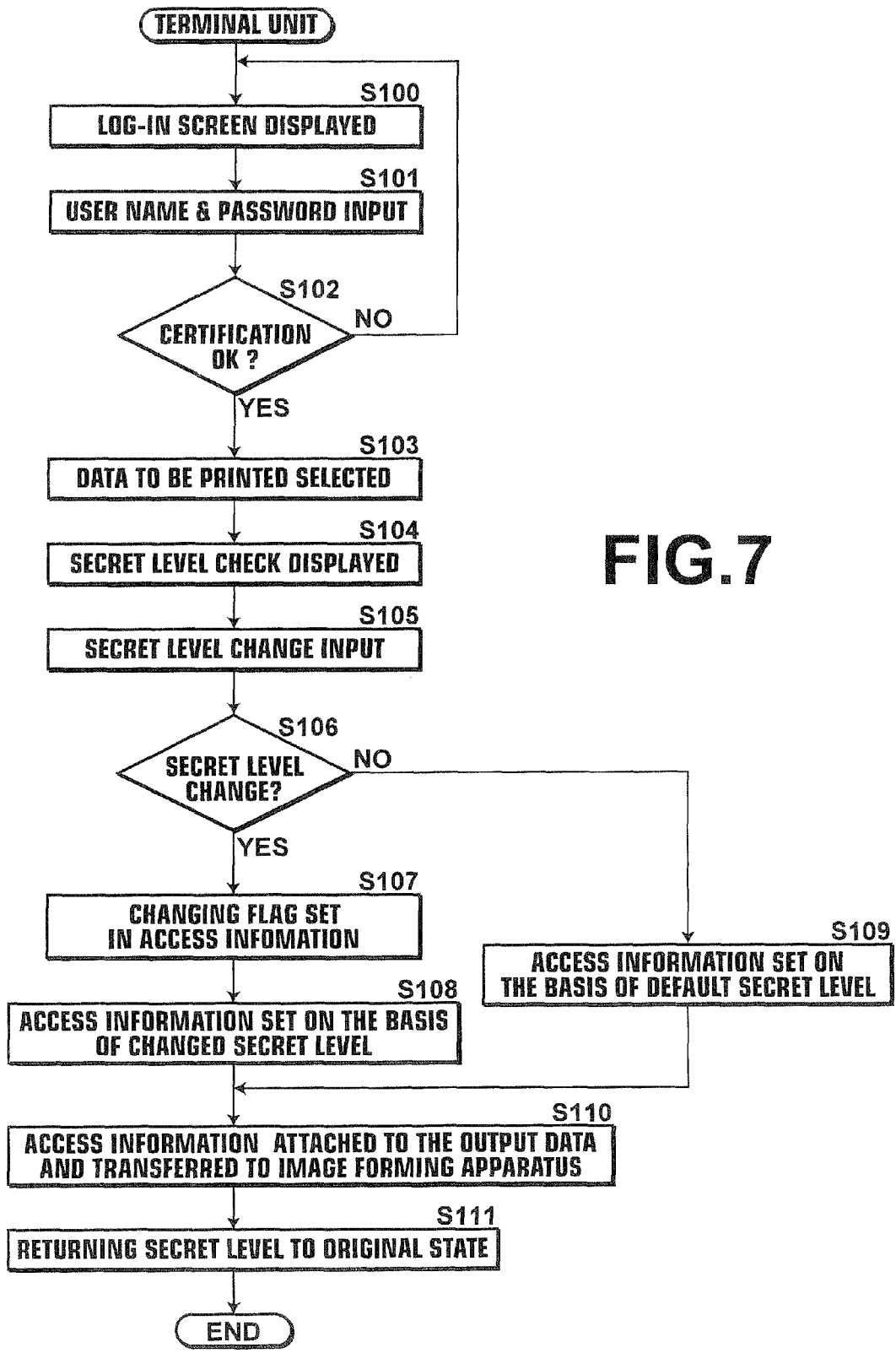
FIG. 7 is a flow chart showing processing of the terminal unit.

The operation when an image is printed according to the output data O by the image forming apparatus of the present invention will be described with reference to FIGS. 7 and 8, hereinbelow.

When the operator starts, the log-in screen is displayed by the certificating means 31 (S100). When the user name and the password are input according to the log-in screen (S101), the user name and the password are compared with the certification information which has been registered in advance and the certification is effected (S102). Though it is preferred that the certification be effected by providing a certification server on the network, the certification may be effected in each terminal unit 3.

After the certification, the operator selects the output data and instructs printing (S103). When the printing is instructed, a screen for ensuring the secret level is displayed on the display screen of the terminal unit 3 (S104). Though information on the right of access to the printing is displayed on the screen for ensuring the secret level, the section and the level of the right of access of the user who logs in are displayed in the default as shown in FIG. 5. When the operator himself or herself goes and receives the printings, the operator does not change the secret level and selects "OK" so that the processing proceeds as it is (S105). Since the secret level has not been changed (S106) in this case, the section code and the level displayed as the access information A are set by the access information setting means 32 so that the level of the right of access is the same level as the level of the right of access of the user who logs in (S109). The access information A is attached to the output data C as the information on the attribute thereof and is transferred together with the output data O to the image forming apparatus 2 by the transmitting means 35 (S110).

The image forming apparatus 2 receives the output data O and the access information A transferred from the terminal unit 3 with the receiving means 251 (S200), and stores them in the output data storage means 252 (S201). The output data O attached with the access information A is not printed as soon as it is received but once stored in the output data storage means 252 to wait input of the user information from the IC card reading system 21 or the input means 253 (S204).

The output user who prints the output data O inserts the IC card into the IC card reading system 21 of the image forming apparatus 2. On the IC card, the user name and the password of the owner has recorded as the user information, and they are read out by the IC card reading system 21 and input into the input means 253.

When the user information is input (S207), the output means 255 compares the access information A of the output data O stored in the output data storage means 252 with the user information (S208). Since the user's name is registered in the image forming apparatus 2 linked with his or her section and level of right of access, the section code and level of right of access are searched for on the basis of the user information read out from the IC card. Comparing with the user's section code and level of right of access the access information attached to the output data O shows, whether the output user has a right of access to the output data O stored in the output data storage means 252 is determined (S209). When it is determined that the output user has a right of access to the output data O, printing is effected according to the output data C stored in the output data storage means 252 (S210). When the certification server is connected to the network, the user's section code and level of right of access to the output data O may be received from the certification server.

When the output user is the person who instructs the printing, printing is naturally effected since he or she has a right of access to the output data O. The output data O finished with output and printing is deleted by the first deleting means 256 from the output data storage means 252 from the viewpoint of security (S211).

Though when the output user is not the person who instructs the printing, and has a right of access to the output data O which is only of a level 1, printing is not effected, but when the output user has a right of access to the output data O which is of a level 3 and the same section code, printing is effected. However, printing is not effected, when the output user has a different section code though he or she has a right of access to the output data O which is of a level 3.

The method of receiving printings where the person lower than the operator in secret level receives the printings as when a person has his or her follower or the like bring the printings will be described, hereinbelow.

When the operator instructs to print after the user name and the password are input according to the log-in screen and the certification is executed, a screen for confirming the secret level is displayed. However, in the state of default, a section code and the level of right of access are displayed as shown in FIG. 5 (S100 to S104). When the head of his or her section attends to a meeting, for instance, he or she sometimes has his or her follower in the same section bring the printed data. However, when the data is secret, he or she sometimes will want his or her follower in the same section to receive the printed data without exposure to eyes of the others. Though the operator who is the head of his or her section has a right of access of the level 3, he or she has to change the access information A when he or she has his or her follower who has a right of access of the level 2.

Figure 6:
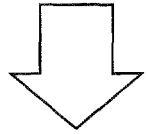
FIG. 6 is a view showing an example of changing the secret level.

An input portion for inputting the section code and the secret level is not made active so that the secret level is not normally changed in order to prevent an accidental control. When a "change allowing button" is depressed in a screen such as shown in FIG. 5, since the input portion is made active by the change allowing means 33, the secret level is set to 2 through the input portion made active (S105). FIG. 6 shows an example of selection of level 2 from a pull-down menu. When the secret level is set to 2 (S106), the access information changing means 34 sets a changing flag in the access information A (S107) and sets the changed secret level as the access information A (S108). This access information A is attached to the output data O as the attribute information thereof and transferred to the image forming apparatus 2 by the transmitting means 35 together with the output data O (S110). When the transfer by the transmitting means 35 is ended, the access information change releasing means 36 releases the change of right of access and returns to the original state to return the level of right of access of the user who logs in to level 3 (S111). The right of access can be changed only for the prints immediately after the change of right of access by thus returning the secret level to the original state every time the transfer by the transmitting means 35 is ended.

The image forming apparatus 2 receives by the receiving means 251 the output data O transferred from the terminal unit 3 and the access information A, and stores them in the output data storage means 252 (S200, S201). The output data O attached with the access information A is not printed as soon as it is received but once stored in the output data storage means 252 to wait input of the user information from the IC card reading system 21 (S204). Further, when the changing flag is set in the access information A, a timer is first started (S203).

When the follower in the same section instructed to receive the data inserts his or her IC card into the IC card reading system 21 of the image forming apparatus 2, the user information is read out from the IC card (S207). In the access information A of the output data O stored in the output data storage means 252, the changing flag is set. Accordingly, the output means 255 compares the section code and the level of right of access of the changing flag set in the access information A with those of the IC card (S208). When the follower who goes to receive the data has a right of access of level 2, printing of the output data O is executed (S209 to S210).

Since printing of the output data O is not executed in this manner unless the IC card having a level of the right of access at least equal to that of the output user having a level of the right of access changed in the terminal unit 3 is inserted into the IC card reading system 21, only a particular person can take out printings of the output data O without exposure to eyes of the others. When the head of the section himself or herself goes to receive the data, printing of the output data O can be executed since the section code and the level of the right of access conform to the original section code and level of the right of access even if the output data O has a changed section code and level of the right of access.

The output data O attached with an access information A where the changing flag is set is deleted by the first deleting means 256 from the output data storage means 252 upon finished with printing from the viewpoint of security (S211).

When the IC card corresponding to the output user where the secret level is changed is not inserted into the IC card reading system 21 for some reason, the output data O where the secret level is changed is left in the output data storage means 252 without printing. Since the output data O attached with an access information A where the changing flag is set is secret, it is not preferred to leave it for a long time without outputting it. Accordingly, the second deleting means 257 periodically checks (S206) the timer which has been started at a time when the output data O is stored in the output data storage means 252 to delete the output data O from the output data storage means 252 in the case a predetermined time lapses (S212).

The section code input from the input portion upon printing in the image forming apparatus described above is also used to totalize the consumption of the consumed material such as ink, papers and the like, and each section is charged according to the usage. By thus controlling whether the output user has a right of printing the output data corresponding to not only the level of the right of access but also the section, secret can be maintained by the sections and at the same time, relating to the consumed material.

Though, the user name and the like are recorded in the IC card to search for them in the user information controlled by the image forming apparatus in the above embodiment, the level of the right of access or the section to which he or she belongs may be recorded in the IC card.

Though the case where the user information is input is described in the above embodiment, it is possible to enter the user information through the control section or to use the biological certification to determine the output user to certify the level of the right of access or the section to which he or she belongs.

Further, though the user who has logged in from the terminal unit 3 is a user who has a right of access in the embodiment described above, the secret level may be set in advance in the terminal set and an access information corresponding thereto may be attached to the access file.

Further, though it is described in the above output form that the above image forming apparatus output to the printing section to print on a recording paper, the above image forming apparatus may output to the display apparatus to display an image.

Though the network is a local area network in the above description, the image forming apparatus and the terminal unit are connected with each other by way of a exclusive cable or the Internet to print a secret document with an image forming apparatus in an office or the home far away from the company.

As described above in detail, in accordance with the present invention, since the printings which normally cannot be taken out by a particular user can be taken out by a different user by temporarily changing the right of access, a secret of output data can be kept while improving the convenience of the user.

What is claimed is:

1. An image forming system for an image forming apparatus forming an image according to output data of the image forming system under an instruction of a terminal unit connected thereto by way of a network to instruct a formation of an image according to output data, the terminal unit comprising an access information setting means which sets an access information representing that only a particular user can access to the output data and a transmitting means which transmits the access information together with the output data to the image forming apparatus and the image forming apparatus comprising a receiving means which receives the access information together with the output data, an output data storage means which stores the output data received by the receiving means, an input means through which user information on a user for whom the data is to be output, and an output means which compares the user information and the access information, and outputs an image by the use of the output data stored in the output data storage means only when the user for whom the data is to be output conforms to the particular user, wherein the terminal unit further comprises an access information changing means which temporarily changes the access information so that a second particular user other than the particular user can access to the output data while the particular user is still capable of accessing the output data and the output means can output an image by the use of the output data stored in the output data storage means when the user for whom the data is to be output conforms not only to the particular user but also to the second particular user so long as the access information has been temporarily changed by the access information changing means so that a second particular user other than the particular user can access to the output data;

the access information indicates whether or not access is permitted for each section and also a degree of level of secrecy;

users having rights at level n are permitted to access output data having access information set at level n or lower;

the access information changing means changes the access information to a level lower than a set level according to input by a user having access rights of the set level or higher, from among users of a section for which access is permitted; and the second particular use is a user of the section for which access is permitted, having access rights of the level to which the access information has been changed.

2. An image forming system as defined in claim 1 in which the image forming apparatus has a first deleting means which deletes the output data stored in the output data storage means after the output means outputs an image by the use of the output data when it receives the access information together with the output data.

3. An image forming system as defined in claim 1 in which the image forming apparatus further has a second deleting means which deletes the output data stored in the output data storage means if an image is not output from the output means by the use of the output data a predetermined time after the output data is stored in the output data storage means when it receives the temporarily changed access information together with the output data.

4. An image forming system as defined in claim 2 in which the image forming apparatus further has a second deleting means which deletes the output data stored in the output data storage means if an image is not output from the output means by the use of the output data a predetermined time after the output data is stored in the output data storage means when it receives the temporarily changed access information together with the output data.

5. An image forming system as defined in claim 1 in which the terminal unit further has a change allowing means for inputting an allowance of a change of the access information and the access information changing means is permitted to change the access information only when the change allowing means inputs an allowance of a change of the access information.

6. An image forming system as defined in claim 2 in which the terminal unit further has a change allowing means for inputting an allowance of a change of the access information and the access information changing means is permitted to change the access information only when the change allowing means inputs an allowance of a change of the access information.

7. An image forming system as defined in claim 3 in which the terminal unit further has a change allowing means for inputting an allowance of a change of the access information and the access information changing means is permitted to change the access information only when the change allowing means inputs an allowance of a change of the access information.

8. An image forming system as defined in claim 4 in which the terminal unit further has a change allowing means for inputting an allowance of a change of the access information and the access information changing means is permitted to change the access information only when the change allowing means inputs an allowance of a change of the access information.

9. The image forming system as defined in Claim 1, wherein:
- the terminal unit comprises an authenticating means for authenticating users; and
- the access information changing means receives input to temporarily enable the second particular user to access the output data and changes the access information after the particular user is authenticated by the authenticating means.

* * * * *